Patented May 18, 1943

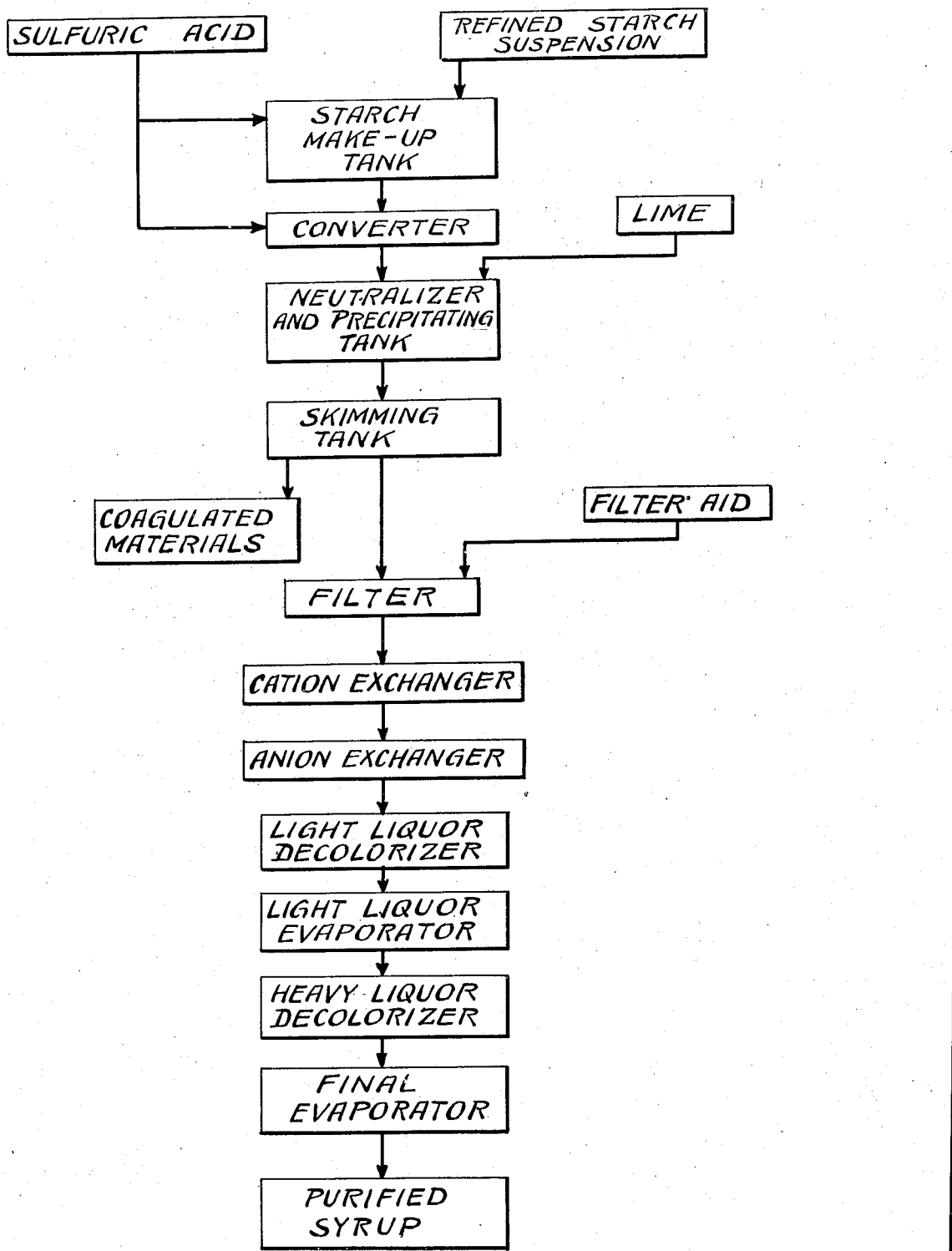

2,319,649

UNITED STATES PATENT OFFICE 2,319,649

METHOD OF MAKING PURIFIED SIRUP

James F. Walsh, Yonkers, N. Y., assignor to American Maize-Products Company, a corporation of Maine Application November 30, 1940, Serial No. 367,934

2 Claims. (Cl. 127—40)

This invention relates to purified sirup and the method of making it. More particularly, the invention relates to starch conversion sirup of low ash content, minimized tendency to caramelization on moderate heating, and substantially no effect upon the inversion of heated sucrose solutions containing the sirup.

In making starch conversion products, it is customary to suspend starch in water containing a small proportion of acid and heat the mixture with steam at superatmospheric pressure until the starch is converted largely to sugars and dextrines. The resulting solution is then treated with alkali, to increase the pH and cause coagulation of coagulable materials such as certain proteins and fats which are present. The coagulated materials are then separated, as by skimming followed by filtration, and the resulting clarified sirup is refined. The usual refining includes passage of the sirup over decolorizing carbon, vacuum evaporation to form heavy liquor, decolorizing the heavy liquor, and then vacuum evaporation of the heavy liquor to the concentration desired.

The acid used in effecting the conversion of starch ordinarily is hydrochloric acid. The alkali used, to neutralize the acid and establish the pH at a desirable value for effecting the coagulation, is usually sodium carbonate. The use of such alkali unfortunately increases the content of metal compounds in the sirup. There is less increase in content of dissolved metal compounds when the acid used in the conversion is sulfuric and the alkali used for neutralizing is lime. The lime forms a precipitate of calcium sulfate which removes a considerable part of the sulfuric acid originally used as well as of the lime.

There is left, however, a solution which is saturated with calcium sulfate and which causes difficulty in further processing or use of the sirup. Thus, the calcium sulfate remaining dissolved in the solution fouls the decolorizing material used to reduce the intensity of color of the sirup, with consequent loss of activity of the said material. Also, the calcium sulfate, being less soluble in boiling than in cold water, deposits as a hard scale on evaporator equipment, particularly upon the steam pipes. The deposition of the calcium sulfate continues to the end of the evaporation. The calcium sulfate appears also as a cloud of suspended material in the final concentrated sirup; filtration of the viscous concentrated sirup to remove the cloud being so tedious as to be impracticable.

Finally, the calcium sulfate left dissolved in the finished sirup is objectionable in promoting caramelization on heating the sirup, as, for example, to 275° F. or somewhat higher in making hard candy from a composition including starch conversion sirup products. Furthermore, the inorganic content of the sirup causes inversion of sucrose in those operations in which the sucrose is heated in the presence of the sirup.

The present invention provides a purified sirup and a convenient method of making it, the sirup being of low ash content and of minimized tendency to caramelization at elevated temperatures of the order of 125° F. to 300° F. or so.

Briefly stated, the invention comprises converting starch in the presence of acid, separating material coagulable on increasing the pH, by the addition of an alkali, and then subjecting the resulting clarified sirup to the action of a hydrogen-base exchanger and an acid exchanger so as to remove from the sirup most of the metal content and also the acidity. In the preferred embodiment, the invention comprises effecting the conversion with sulfuric acid, subsequently neutralizing with lime to the pH stated later herein, and then treating the sirup with the two types of exchangers as described, to remove metal and acid.

It will be understood that the base exchangers of the kind used by me are those which are employed conventionally for the removal of metals, the metals presumably being substituted in the solution by hydrogen. The acid exchangers remove acidity without introducing any substantial proportion of metal. For simplicity, it may be considered that the acid (anion) exchanger removes acid from the sirup, possibly largely by substituting hydroxyl groups for acid radicals, the radicals becoming combined or adsorbed in the acid exchanger.

A suitable sequence of steps in my process is shown in the flow sheet of the attached drawing, to which reference is made.

In a specific example of the practice of the invention, the following procedure is used.

Starchy material, such as refined starch from potatoes, corn, wheat or barley or an impure material known as table-head starch, is suspended in water and converted to reducing sugars and dextrines, by hydrolysis in the presence of an added acid. Thus, the starchy material may be mixed with water in such proportion as to give a density of about 12° to 23° Bé. Sufficient sulfuric acid is added, with stirring, to establish the pH at about 0.5 to 2. Conversion is then effected under steam pressure, at usual temperature and in about the usual period of time.

The conversion may be conducted to stage desired, as, for example, to a D. E. of about 30 to 92, the degree of conversion being selected in accordance with the use to which the product is to be put and being controlled by means of the pH, the temperature, and the period of time during which the temperature of conversion is maintained, all in well known manner.

The resulting solution is then treated with lime so as to adjust the pH to that desired for the coagulation of coagulable organic substances. Ordinarily the pH is adjusted to about 3.5 to 5. The addition of the lime serves, also, to precipitate as calcium sulfate a part of the sulfuric acid present, some of the sulfate remaining dissolved.

The coagulated organic substances are then separated largely by skimming. The remaining part of the coagulated substances and precipitated calcium sulfate are then separated by filtration, a filter aid being used. The filtrate obtained is clarified sirup, or light liquor.

The clarified sirup is then treated with a hydrogen-base exchanger, to remove metals present in the form of soluble compounds. These metals include those present originally in small proportion in the starchy material and also that part of the calcium added originally in the form of lime that failed to precipitate as sufate.

These hydrogen-base exchangers are sometimes called hydrogen zeolites or organolites. After having exchanged hydrogen for metals in solutions and having become spent, they are activated by acid.

Among the materials that meet the requirements of the hydrogen-base exchanger and that may be used to advantage is the activated organic material produced by treatment of coal, lignite, or wood by the process described by Tiger in Transactions of the American Institute of Mechanical Engineers, 60, No. 11, 315–325 (1938). This base exchanger has the property of removing various amounts, up to about 7000 grains or somewhat more, of sodium or other metals from solutions passed slowly over the material, for each cubic foot of the material. It is preferably used under such conditions as to acidity that the solution in contact with the exchanger is acid to phenolphthalein, say of pH value below 8.3 and preferably 4.5 to 6.

Another base exchanger that may be used to advantage is the product of the condensation of formaldehyde with one of the sulfonated phenols, either insolubilized and activated initially or regenerated by acid treatment.

Another base exchanger that may be used is one made as described in U. S. Patent 2,198,381 issued to Ellis.

The invention is not limited to the use of any one particular base exchanger. There may be used any of the commercial base exchangers which remove metals from aqueous solutions of their salts and that do not introduce into the sirup treated any substantial amount of interfering water soluble by-products except acid.

The hydrogen-base exchanger selected is preferably used in granular form and filled into a container or tower. The clarified sirup to be lowered in metal content is caused to flow slowly through the cation (base) exchanger, at such a rate that the time of contact with the base exchanger is substantial, say 1 to 4 hours or more.

If necessary to separate the base exchanger completely from the clarified sirup the effluent from the container for the base exchanger is filtered.

The sirup, after being contacted with the hydrogen-base exchanger, is then contacted in like manner with a conventional acid exchanger to remove acid and produce a solution of pH not substantially less than 4.5 to 6, the exchanger selected being one that is unobjectionable in subsequent refining of the product and that does not introduce metal in substantial amount.

The acid exchanger used is a product such as a synthetic resin which removes anions and more especially acid, either by adsorption or by replacement by water. Thus, the action of the acid exchanger may be considered for convenience either as the exchange of hydroxyl groups for the acid radicals in the clarified sirup or direct adsorption or combination with the acid.

Acid exchangers that may be used include the following:

Aromatic amine-aldehyde resins modified by introducing, before, during, or after the condensation, a group that enhances the basicity of the resin. Thus, the resin may be after-alkylated. In general, the acid exchanger of this type may be one made as described in British Patent 495,032, issued on November 4, 1938, to I. G. Farbenindustrie.

Another acid exchanger that may be used is made as described in British Patent 495,401, issued on November 14, 1938, to I. G. Farbenindustrie. Exchangers of this type are made by causing a primary aromatic amine-aldehyde resin to react wholly or partially, before or after the condensation with aldehyde, with a substance that contains a CN group linked to a nitrogen atom, as, for example, with dicyanodiamide. Among examples of such exchangers are m-aminobiguanidylbenzene.

The selected acid exchanger may be used in any suitable form, as, for example, as granules if the exchanger is itself firm. Or, it may be applied as a surface coating over a granular support such as coke, pumice stone, charcoal, or activated carbon. In fact, the acid exchanger may be formed from ingredients separately applied to the selected support. Thus, there may be used an acid exchanger of the kind described in British Patent 506,291 issued on May 25, 1939, to The Permutit Co. Ltd. et al., as, for example, the resinous reaction product of heating, at 10 to 20 pounds steam pressure, a solution of m-phenylene diamine hydrochloride with paraformaldehyde or other source of formaldehyde.

The exchangers, on becoming inactive or spent, are revivified in manner that is customary for the particular exchanger used.

After the removal of metals and acid by contacting the sirup with the exchangers as described, the remaining sirup is then refined by usual process of treatment, such as shown on the flow sheet or the following procedure.

Any suspended particles of exchanger are separated, as by filtration.

The sirup is then passed through a light liquor decolorizer, if decolorizing subsequent to the exchangers treatments is desirable in the use for which the finished product is intended. The decolorizing may be made in conventional way, as, for example, with activated carbon or bone char.

The sirup is then concentrated by vacuum evaporation to heavy liquor, of density about 30°

Bé. This heavy liquor is suitably decolorized as above, in accordance with the usual practice for heavy liquor decolorization.

The heavy liquor is then subjected to evaporation in a vacuum evaporator, to concentration desired for sale or further processing of the product, suitably from 40° to 45° Bé. In one embodiment of the invention, the decolorized heavy liquor may be further processed by spray drying to dried corn sirup solids of not substantially more than 4 per cent water. Heavy liquor of very high conversion may be solidified to 70 to 80 type block or chip sugar, in accordance with usual technique.

The concentrated sirup without solidification or the solidified material may be used in making confectionery products and baked goods, or for other purposes in which a staple, starch conversion product of very low ash content 's desirable.

When my product is used in compositions that are heated during manufacture, there is noted a minimized tendency to carmelization.

Furthermore, the process of manufacture is simplified, in that the objectionable fouling of the decolorizing agent and formation of calcium sulfate scale in the evaporators is eliminated.

The ash content of the product is very low. Whereas corn starch conversion sirup as ordinarily made contains about 0.2 to 0.35 part of ash for 100 parts of solids present, my purified sirup made from the same starchy raw material contains not substantially more than 0.05 part of ash on the same basis. Corresponding improvement is observed in the conversion sirups from other starchy materials.

My product of low ash content is without substantial effect on the amount of inversion of sucrose solutions on being heated therewith. This is an important feature, inasmuch as starch conversion sirups are frequently incorporated into sucrose solutions that are heated, as, for instance, during the manufacture of hard candies and compounded sirups.

It will be understood that the details given are for the purpose of illustration and that variations within the spirit of the invention are intended to be included within the scope of the appended claims.

What I claim is:

1. In making a purified starch conversion sirup, the method which comprises converting starch by warming with a dilute aqueous solution of sulfuric acid constituting the only acid present in substantial proportion, treating the resulting solution with lime in amount to establish the pH at approximately 3.5 to 5 and cause coagulation of coagulable material and precipitation of part of the sulfuric acid, separating the coagulated and precipitated materials to form a clarified liquor, treating the clarified liquor with an acid exchanger to remove acid, and then concentrating and decolorizing the treated liquor to form a refined sirup.

2. The method described in claim 1 which includes treatment of the clarified liquor with a cation exchanger to remove metal before treating the liquor with the said acid exchanger.

JAMES F. WALSH.